(No Model.)
E. R. BUHRMAN.
AUTOMATIC AIR VENT FOR CASKS.
No. 488,160. Patented Dec. 13, 1892.
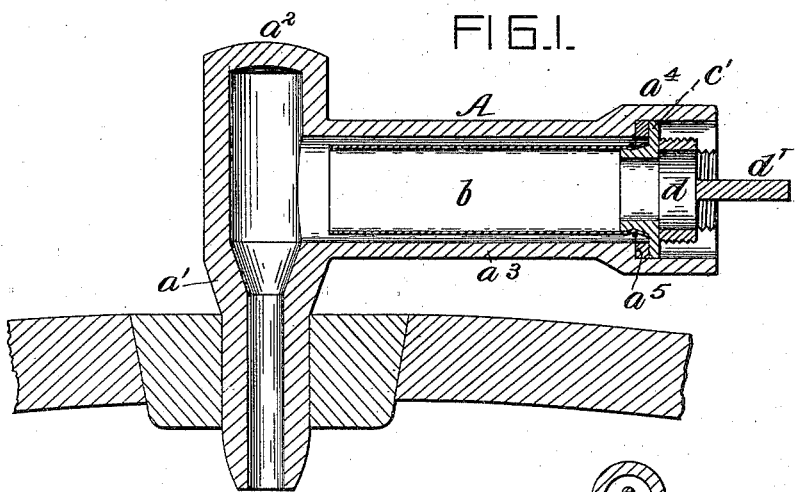
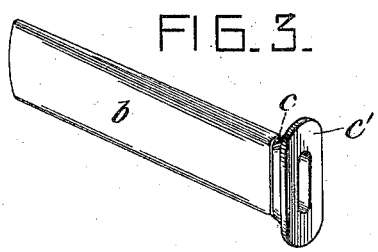
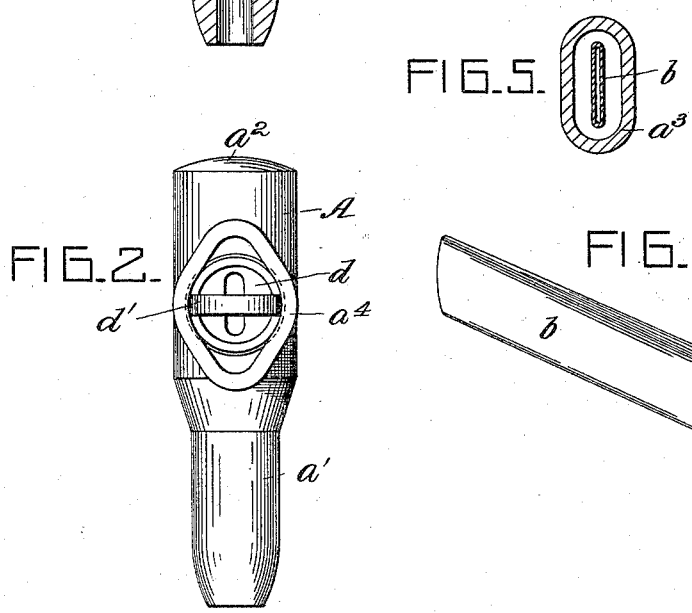
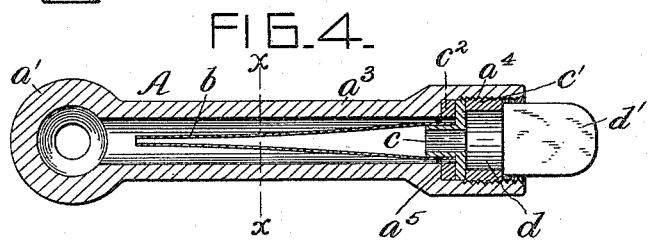
Witnesses:
W. C. Jirdinston
Sandon Freybler
Inventor:
Edward R. Buhrman
by L. M. Hosea
Attorney.

UNITED STATES PATENT OFFICE.

EDWARD R. BUHRMAN, OF CINCINNATI, OHIO.

AUTOMATIC AIR-VENT FOR CASKS.

SPECIFICATION forming part of Letters Patent No. 488,160, dated December 13, 1892.

Application filed July 19, 1892. Serial No. 440,462. (No model.)

*To all whom it may concern:*

Be it known that I, EDWARD R. BUHRMAN, a citizen of the United States, residing at Cincinnati, Ohio, have invented new and useful Improvements in Automatic Air-Vents for Casks, &c., of which the following is a specification.

My invention relates to automatic air-vents for casks and other closed vessels designed to permit the entrance of air when necessary to allow the escape of liquid yet prevent the escape of gas; and it consists in an improved construction whereby the action is rendered more efficient and the cleansing of the implement is facilitated.

My improved vent-valve is illustrated in the accompanying drawings, in which—

Figure 1 is a side elevation of the device complete, sectioned axially in a vertical plane; Fig. 2, an end view from the air-inlet end; Fig. 3, a detached perspective view of the rubber-tube valve with its holding-plug; Fig. 4, a plan view sectioned horizontally through the valve-chamber proper, and Fig. 5 a cross-section of the valve-chamber and valve on line $x$ $x$ of Fig. 4.

Referring to the drawings, A designates the valve-casing consisting of a conical driving-spigot $a'$, having a driving-head $a^2$, all of a circular cross-section and adapted to be driven into a barrel, (carrying the vent-bung inward before it, if necessary,) and a lateral tubular valve-casing $a^3$ of flattened oval cross-section terminating at its free end in an enlargement $a^4$, having an internal shoulder or annular ledge $a^5$. A continuous aperture extends through the spigot and its lateral extension.

The valve proper consists of a flattened rubber tube $b$ open at both ends. The tube is made flat, so that the inner sides lie in contact throughout, completely closing the aperture. At one end of the tube is inserted a flanged perforated plug $c$, to which the tube is secured by "wiring" or in any other convenient manner, the flange $c'$ of the plug extending outward over and fitting upon the ledge or shoulder $a^5$ of the valve-casing, with an interposed packing ring or washer $c^2$ of rubber or other suitable material to form an air-tight joint. A perforated screw-plug $d$, provided with a manipulating-handle $d'$, is threaded within the enlargement $a^4$ of the valve-casing $a^3$, and bears against the flange $c'$ of the plug $c$, holding it firmly to its seat, but permitting its ready removal.

The general action of the device is as follows: When the tubular spigot $a'$ is driven into a cask or vessel containing a gaseous liquid—such, for example, as beer—the outward pressure of gas compresses the sides of the rubber tube together and prevents the escape of gas. When a portion of the liquid is drawn off and there is no longer sufficient gas to take the place by further expansion of the liquid being drawn off, air enters through the tube $b$ in proportion as the liquid passes off. When the drawing off is concluded, the slight back-pressure caused by the release of gas from the remaining liquid again closes the sides of the tube $b$ together and thus prevents undue access of air and preserves the beer from unnecessary flatness.

In order to insure the proper action of the device, a relatively-considerable length of tube is required in order that a very slight back-pressure acting upon a considerable surface will secure and maintain a proper closure.

It will be readily understood that the implement in order to operate effectively must respond to somewhat-delicate pressures, for which reason the buckling or warping of the tube $b$ out of a straight axial line is very necessary to be avoided. This is especially likely to occur in the use of the apparatus in liquids—such as beer—containing saccharine or gummy matters, which settle and coagulate upon the inner surfaces of the rubber tube, while it may be "buckled" by the back-pressure of the gases and retain it in such position after the pressure ceases and so render it ineffective to admit air when required. In order to prevent this tendency the cross-section of the valve-casing $a^3$ is substantially similar to that of the tube, giving just enough room for its proper expansion, but not enough to admit of "buckling." The tube is thus far less apt to become inoperative. Upon the removal of the tube-valve for cleansing a forced current of water is driven through it. The tube being freely opened at its ends is quickly and thoroughly cleansed by the mechanical and solvent action of the water.

I claim as my invention—

1. In a barrel-vent of the character indicated, a driving-nozzle having a lateral elongated extension, and a flattened rubber tube secured in said extension, the extension being of oblong cross-section corresponding with and slightly larger than the tube, substantially as set forth.

2. In a barrel-vent of the character indicated, the combination of a flattened metallic tube provided with a terminal driving-nozzle and an opposite terminal enlargement inclosing an annular ledge or shoulder with a flattened rubber tube provided with a metallic flanged hollow plug attached thereto, and a hollow seating-plug threaded in said terminal enlargement, substantially as set forth.

In testimony whereof I have hereunto set my hand in the presence of two subscribing witnesses.

EDWARD R. BUHRMAN.

Witnesses:
L. M. HOSEA,
LANDON FREYBLER.